(12) United States Patent
Ota

(10) Patent No.: US 7,356,895 B2
(45) Date of Patent: Apr. 15, 2008

(54) MACHINE TOOL

(75) Inventor: Hidehito Ota, Yamatokoriyama (JP)

(73) Assignee: Mori Seiki Co., Ltd., Yamatokoriyama-shi (JP)

(*) Notice: Subject to any disclaimer, the term of this patent is extended or adjusted under 35 U.S.C. 154(b) by 0 days.

(21) Appl. No.: 11/739,105

(22) Filed: Apr. 24, 2007

(65) Prior Publication Data

US 2007/0251071 A1    Nov. 1, 2007

(30) Foreign Application Priority Data

May 1, 2006 (JP) .............................. 2006-127279

(51) Int. Cl.
*B23Q 7/00* (2006.01)
*B23C 1/14* (2006.01)

(52) U.S. Cl. ................. 29/27 C; 29/26 A; 29/38 B; 409/168; 409/224; 409/235; 269/58; 269/73; 408/89; 408/234

(58) Field of Classification Search ............. 29/27 C, 29/27 R, 26 A, 26 R, 38 A, 38 B, 33 P; 409/163, 409/164, 165, 168, 197, 198, 219, 220, 221, 409/224, 225, 235; 269/55, 56, 57, 58, 59, 269/71, 73, 74, 303; 408/89, 90, 91, 234
See application file for complete search history.

(56) References Cited

U.S. PATENT DOCUMENTS

| | | | | |
|---|---|---|---|---|
| 3,248,101 A * | 4/1966 | Muller et al. | .................. | 269/73 |
| 3,361,033 A * | 1/1968 | Muller | ....................... | 409/168 |
| 3,822,959 A * | 7/1974 | Tabard | ........................ | 408/89 |
| 3,826,584 A * | 7/1974 | Mengeringhausen | ......... | 408/35 |
| 3,998,127 A * | 12/1976 | Romeu | ....................... | 409/235 |
| 4,644,635 A * | 2/1987 | Murai et al. | .................. | 483/54 |
| 4,664,570 A * | 5/1987 | Tsukiji et al. | ................. | 409/84 |
| 4,858,290 A * | 8/1989 | Hirose et al. | ................ | 29/35.5 |
| 5,172,464 A * | 12/1992 | Kitamura et al. | ............. | 29/563 |
| 5,669,867 A * | 9/1997 | Hoppe | .......................... | 483/55 |
| 5,762,594 A * | 6/1998 | Hoppe | .......................... | 483/56 |
| 5,909,988 A * | 6/1999 | Hoppe et al. | ................ | 409/234 |
| 6,948,894 B2 * | 9/2005 | Taga et al. | .................. | 409/235 |

* cited by examiner

*Primary Examiner*—Dana Ross
(74) *Attorney, Agent, or Firm*—Judge Patent Assoc.

(57) ABSTRACT

Machine tool furnished with: a table (20) free to swivel about a horizontal swivel center axis, and having a table body (22) for carrying a workpiece, and an axially rotatable rotary shaft (23) disposed with the axis of the rotary shaft (23) coinciding with the swivel center axis, with a first end of the rotary shaft affixed to the table body (22); a support structure (15) for supporting rotatably the rotary shaft (23) via a bearing (15b); a swivel drive mechanism (25) for axially rotating the rotary shaft (23); riding members (31) abutting on an outer-peripheral locus on a rotary shaft (23) second end, off a portion, supported by the bearing (15b), of the rotary shaft (23); and hold-down mechanisms (32) arranged on the support structure (15), for supporting the riding members (31) and thereby pressing on and apply a load to the rotary shaft (23) outer-peripheral locus from above.

11 Claims, 6 Drawing Sheets

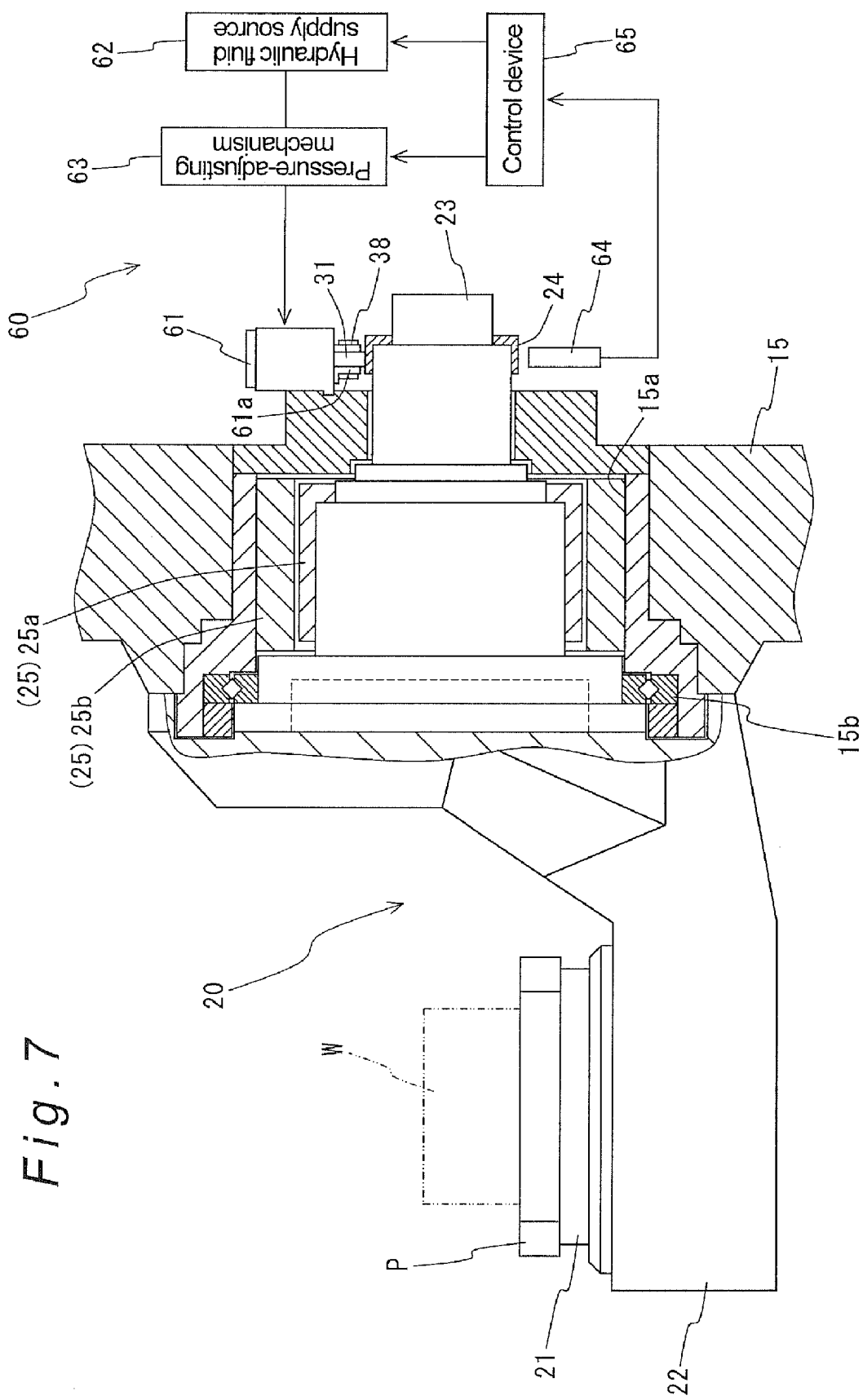

MACHINE TOOL

BACKGROUND OF THE INVENTION

1. Technical Field

The present invention relates to machine tools furnished with a table atop which a workpiece is carried, a support structure for supporting the table allowing it to swivel about a horizontal swivel center axis, and a swivel drive mechanism for swiveling the table upon the swivel center axis to index the table to a specific swivel angle position.

2. Description of the Related Art

Such machine tools known to date include the example disclosed in Japanese Unexamined Patent App. Pub. 10-180523. This machine tool primarily is made up of: a machine column provided upright as appropriate on the installation surface; a horizontal slide placed on the upper face of the machine column movably right and left in the horizontal plane; a vertical slide placed on the upper face of the horizontal slide movably back and forth in the horizontal plane; a main spindle disposed so that its own axis is perpendicular, for retaining a tool; a spindle head provided on the front face of the vertical slide to freely move perpendicularly, for supporting the main spindle free to rotate axially; and a rotatable table supported on the front face of the machine column allowing it to swivel about a swivel center axis paralleling the back-and-forth orientation, and configured free to rotate upon the rotational center axis paralleling the perpendicular orientation.

This machine tool also has a horizontal slide guide mechanism for guiding the horizontal slide movement along the right-and left orientation, a vertical slide guide mechanism for guiding the vertical slide movement along the back-and-forth orientation, a spindle head guide mechanism for guiding the spindle head movement along the perpendicular orientation, a horizontal slide feed mechanism for moving the horizontal slide in the right-and-left orientation, a vertical slide feed mechanism for moving the vertical slide in the back-and-forth orientation, a spindle head feed mechanism for moving the spindle head in the perpendicular orientation, and a rotational drive mechanism for rotating the mains spindle upon its own axis.

The rotatable table comprises a rotating member on which a workpiece is carried, a disc-shaped axially rotatable support member disposed so that its own axis coincides with the swivel center axis, an axially rotatable rotary shaft disposed centered on the support member axis, with a first end of the rotary shaft affixed to the back face of the support member, and a table body for supporting the rotating member rotatably upon the rotational center axis.

The support member is supported by the machine column free to rotate axially owing to the engagement between the support member outer periphery and the machine column front face, and the rotary shaft is supported by the machine column via a bearing free to rotate axially, so that the axial rotations of the support member and the rotary shaft allow the rotating member and the table body to swivel upon the swivel center axis. Meantime, the rotating member, as well as the support member and the rotary shaft, are configurationally driven and rotated by a driving device.

The horizontal slide, vertical slide and spindle head in such a machine tool are moved by the feed mechanisms in the predetermined feed orientations, while guided by the guide mechanisms, and simultaneously the main spindle is rotated upon its own axis by the rotational drive mechanism, so that the workpiece carried on the rotatable table (the rotating member) is processed by the tool held in the main spindle.

During processing, the rotating member is rotated upon the rotational center axis by the driving device, and is indexed to a specific rotational angle position, and the table body is swiveled upon the swivel center axis by the deriving device, and is indexed to a specific swivel angle position.

In this conventional machine tool, however, the moment originating in the weight of the rotatable table itself and of the workpiece carried on the rotatable table causes the swivel center axis to downwards tilt out of the horizontal (that is, the rotating member, table body and rotary shaft are sloped), and thus prevents high precision processing of the workpiece, because with the rotational table protruding from the machine column, only one end of the rotational table is supported.

Specifically, along with the upsizing of the rotatable table, its weight increases, the distance between a portion, supported by the machine column, of the rotatable table and the center of gravity of the rotatable table lengthens, and a heavier and heavier workpiece is carried on the rotatable table, with the result that the greater moment is produced to further prevent the high precision processing.

In addition, although the life of the bearing for supporting the rotary shaft of the rotatable table structurally depends on the load and moment applied on the bearing, the moment has more significant effect on the bearing, compared with the load. For this reason, the larger the moment applied to the bearing, the shorter the bearing life.

The present invention is directed to solving these problems, and an object of the invention is to make available a machine tool that prevents the lower processing precision and shorter bearing life resulted from the table tilting that the moment produced by the weight of the table itself causes.

BRIEF SUMMARY OF THE INVENTION

To achieve this object, a machine tool according to a preferred aspect of the present invention comprises: a table free to swivel about a horizontal swivel center axis, and having a table body for carrying a workpiece and an axially rotatable rotary shaft disposed so that its own axis coincides with the swivel center axis, with a first end of the rotary shaft affixed to the table body; a support structure for rotatably supporting the rotary shaft via a bearing; a swivel drive mechanism for axially rotating the rotary shaft so as to index the table to a specific swivel angle position; an axially rotatable main spindle for retaining a tool; a rotational drive mechanism for axially rotating the main spindle; feed mechanisms for moving the support structure and the main spindle relatively; a riding member that contacts to an outer-peripheral locus on a rotary shaft second end, off a portion, supported by the bearing, of the rotary shaft; and a hold-down mechanism for, while supporting the riding member, pressing from above with the riding member on the outer-peripheral locus to apply a load on it.

With the machine tool according to this aspect of the present invention, when the hold-down mechanism via the riding member presses from above on, applying a downward load to, the outer-peripheral locus on the second end, off the bearing-supported portion, a downward load acts on the table on the end, along the swivel center axis, across the bearing from the table-body end, resulting in that a moment which counteracts the moment originating in the weight of the table itself and the workpiece carried on the table acts on the table. Such a counteracting moment prevents the swivel center axis (the table body and the rotational center axis) from tilting downwards due to the moment originating in the weight of the table itself and the workpiece, and thus the swivel center axis, the upper surface of the table body and the rotational center axis are horizontally equilibrated.

It is to be noted that on where the load is applied by the hold-down mechanism is preferably determined as a locus apart from the bearing-supported portion of the rotary shaft. Applying the load on such a locus lessens the load required to counteract the moment, softening the impact of the applied load on the bearing life.

Subsequently, the swivel center axis, the upper surface of the table body and the rotational center axis are horizontally equilibrated, before the workpiece is processed. That is, the support structure and the main spindle are moved relatively by the feed mechanisms to move the workpiece carried on the table (the table body) and the tool held in the main spindle relatively, and the main spindle is rotated axially by the rotational drive mechanisms, with the result that the workpiece is processed. For processing the workpiece, more specifically, the rotary shaft is axially rotated by the swivel drive mechanism to index the table body to a specific swivel center axis.

A machine tool according to the present invention thus makes it possible to horizontalize the swivel center axis, the upper surface of the table body and the rotary shaft by pressing the outer-peripheral locus on second end, off the bearing-supported portion, to counteract the moment originating in the weight of the table itself and the workpiece, affording high precision workpiece processing.

Although applying the load on the outer-peripheral locus on the second end increases a load that acts on the bearing, doing so counteracts the moment that has much impact on the bearing life than the load, so that the bearing life is lengthened.

Furthermore, the machine tool may further comprise a load-adjusting mechanism for controlling the load applied by the hold-down mechanism. Because the amount of tilting of the swivel center axis, table body and the rotary shaft differs depending on, for example, the weight of the workpiece to be processed, the amount of the load applied by the hold-down mechanism on the outer-peripheral locus on the rotary shaft second end requires to be varied with a change in the weight of the workpiece. Therefore, allowing the load-adjusting mechanism to adjust the load applied by the hold-down mechanism makes it possible to apply on the rotary shaft the load that depends on the weight of the workpiece. Adjusting the load equilibrates horizontally the swivel center axis, the upper surface of the table and the rotary shaft to enable high precision processing even if the weight of the workpiece is changed, and meanwhile incompletely counteracts the moment to resultantly prevent the bearing life from shortening.

Additionally, the riding member may be configured with rollers disposed axially parallel to the rotary shaft axis and supported by the hold-down mechanism free to rotate axially. Such a configuration lowers the friction resistance developed between the rotary shaft and the riding member to lessen the load acting on the drive motor included in the swivel drive mechanism and to enable the smooth rotation of the rotary shaft.

Alternatively, the riding members may be provided on either side of the plumb plane including the axis of the rotary shaft, and may have the hold-down mechanisms and the load-adjusting mechanisms in one-to-one correspondence. For example, given that only one riding member is provided, the riding member is likely to fail to apply the load on the rotary shaft adequately, because the riding member or rotary shaft runs idle unless where the riding member contacts with the outer-periphery locus on the rotary shaft is out of the plumb plane including the rotary shaft axis. Being provided on either side of the plumb plane including the rotary shaft axis, however, the two riding members press balancingly, and thus apply load on, the outer-peripheral locus on the rotary shaft.

Besides, the machine tool may further comprises a displacement sensing means for detecting a plumb displacement of the table body or the rotary shaft, relatively to their perpendicular position with the upper surface of the table body horizontalized, and a controlling means for controlling, based on the displacement sensed by the displacement sensing means, the load adjusting mechanism so as to adjust the load applied on the outer-peripheral locus on the rotary shaft to eliminate the displacement.

In such a configuration, although the swivel center axis, the upper surface of the table body, and the rotary shaft are horizontally equilibrated by the load applied on the rotary shaft, the table body or the rotary shaft tilts to cause its plumb position change, because the moment gets out of balance when the load that the hold-down mechanism is to apply on the rotary shaft varies depending on the weight of the workpiece to be processed. This plumb position change is detected as the displacement by the displacement sensing means. Subsequently, based on the displacement detected by the displacement sensing means, the control means controls the load-adjusting mechanism so as to adjust the load applied on the outer-peripheral locus on the rotary shaft to eliminate the displacement.

Therefore, also in this configuration, the same effect as described in the foregoing is achieved, and in addition the load applied on the outer-peripheral locus on the rotary shaft is automatically adjusted, so that the precise and efficient load adjustment is carried out.

Moreover, feasible is a configuration in which an annular rotary member that rotates with the rotary shaft is provided on the outer-peripheral locus on the rotary shaft, and the riding member is configured so as to contact with a perimeter of the rotary member. In such a configuration, the riding member contacts with the perimeter of the member different from the rotary shaft, so that, advantageously, the riding member-contacting perimeter is configured so as to resist wear, and the worn-out rotating member is exchanged.

As described in the foregoing, with the machine tool in accordance with the present invention, pressing from above, and apply load on, the outer-peripheral locus on the rotary shaft second end to counteract the moment originating in the weight of the table body itself and the workpiece, horizontalizing the rotary shaft, the upper surface of the table, and the rotary shaft to enable high precision processing. Furthermore, counteracting the moment that has a greater impact on the bearing life than the load lengthens the bearing life.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 7 is a sectional schematic view showing a table and a load applying-mechanism in accordance with a preferred embodiment of the present invention.

DETAILED DESCRIPTION OF THE INVENTION

Figure 1:
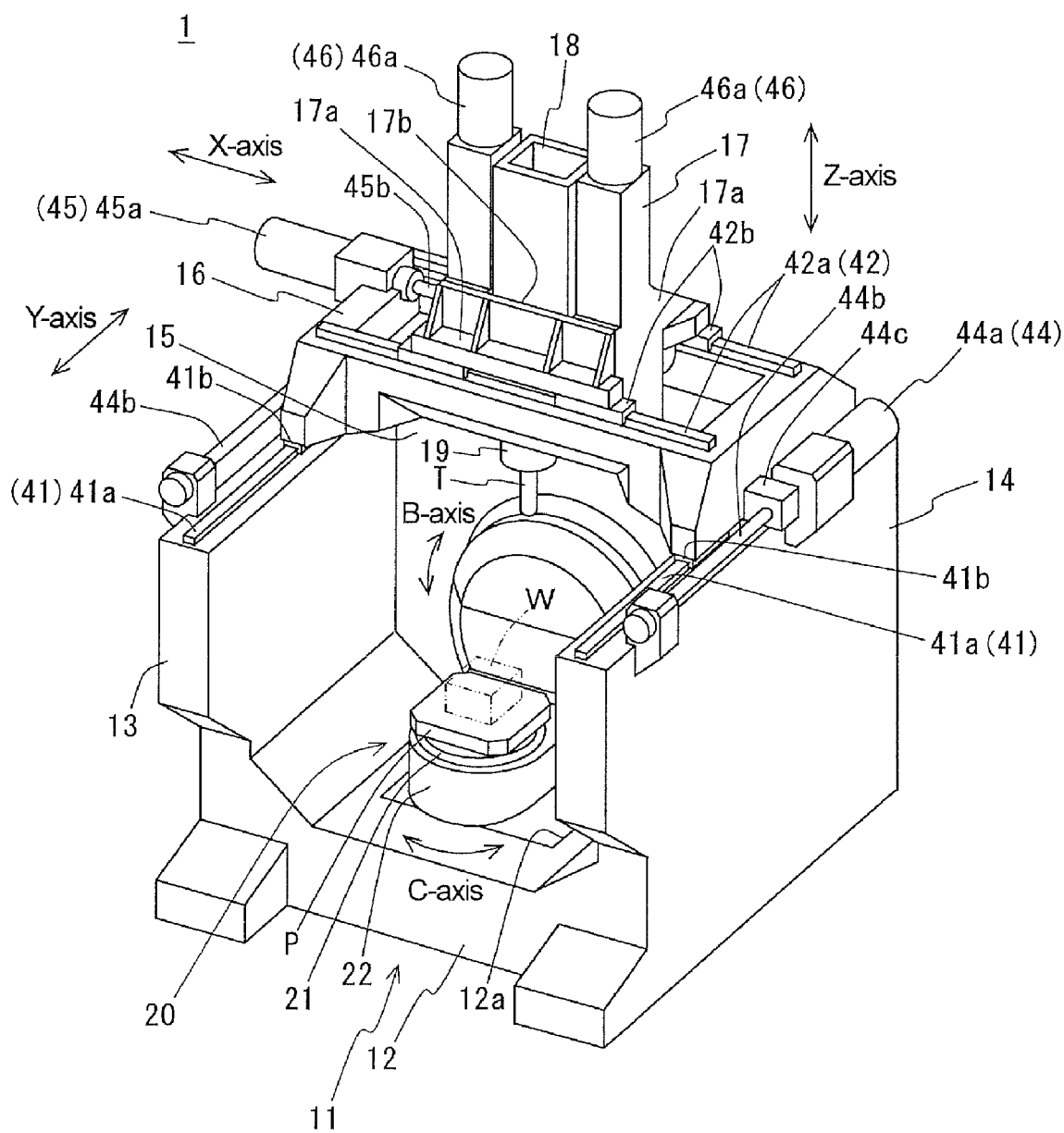
FIG. 1 is an oblique schematic view of a machine tool in accordance with a preferred embodiment of the invention.
Figure 2:
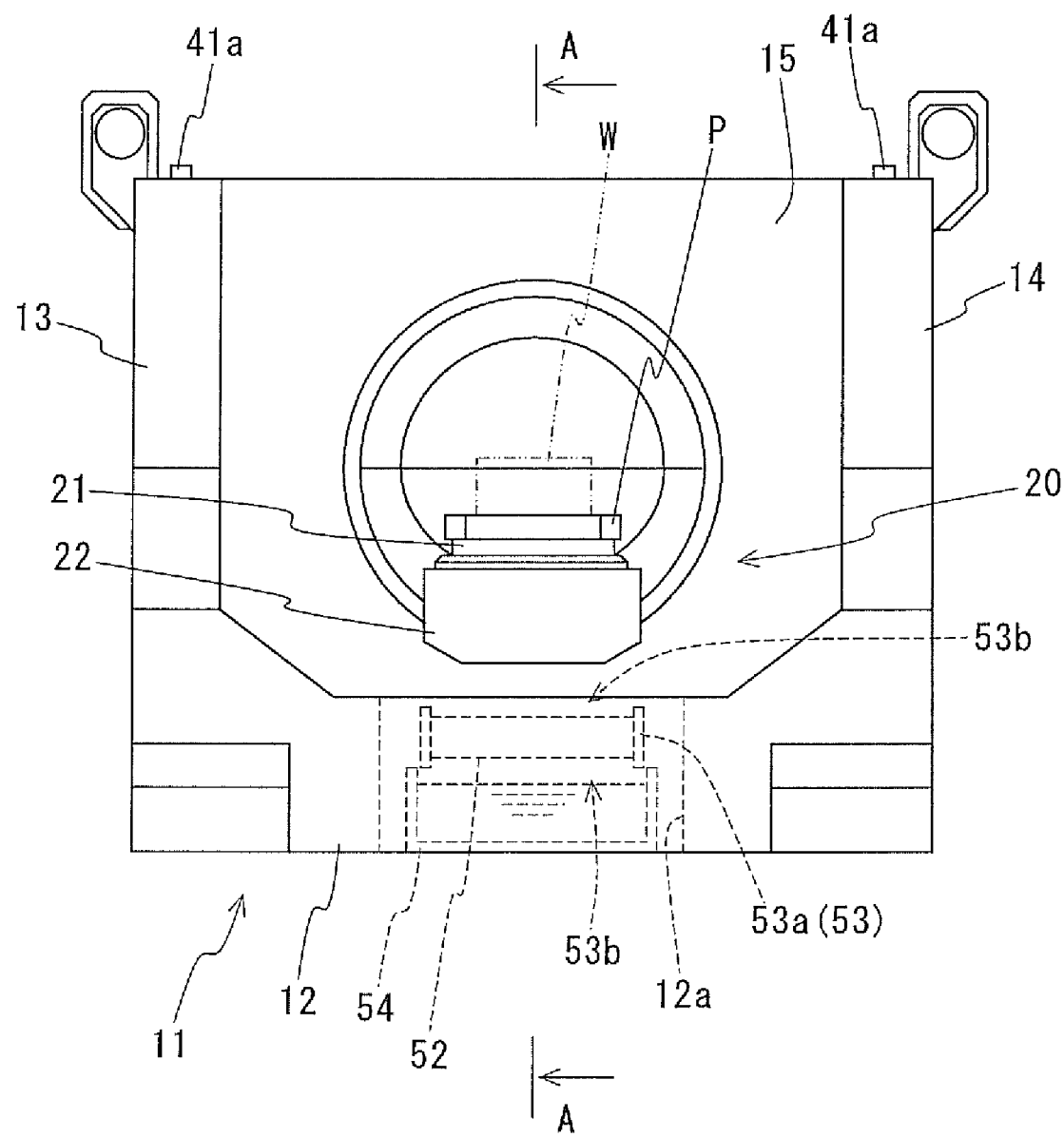
FIG. 2 is a front view showing a part of a machine tool in FIG. 1.
Figure 3:
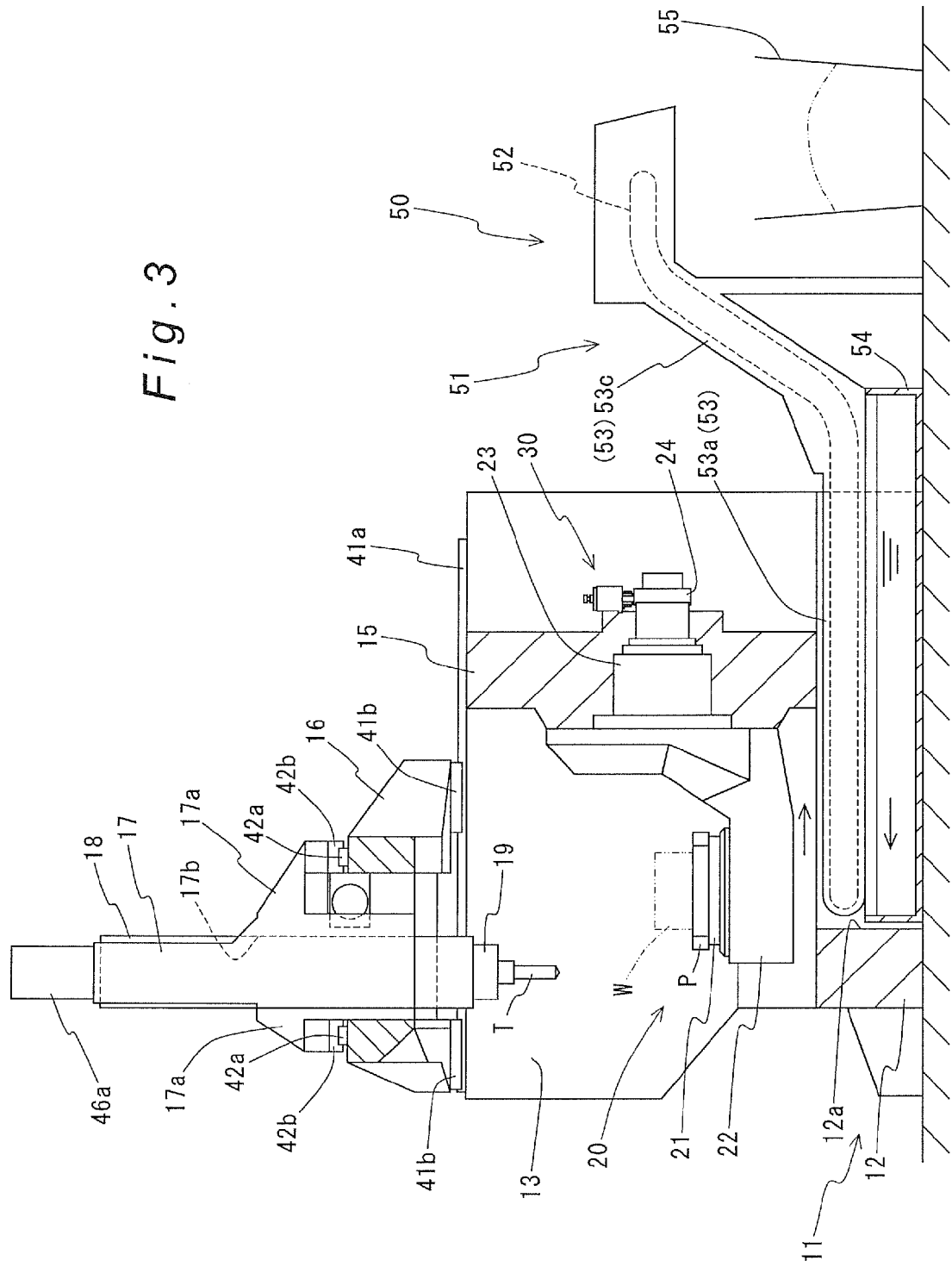
FIG. 3 is a section view through line A-A in FIG. 2.

A preferred embodiment of the invention is described below with reference to the accompanying figures.

As illustrated in FIG. 1 through FIG. 6, a machine tool 1 in accordance with this embodiment of the present invention comprises: a bed (a support structure) 11; a first saddle 16 disposed on the bed 11 free to move back and forth (along the Y-axis) in a horizontal plane; a second saddle 17 disposed on the first saddle 16 free to move right and left (along the X-axis) in a horizontal plane; a spindle head 18 disposed on the second saddle 17 free to move perpendicularly (along the Z-axis); a main spindle 19, for retaining a tool T, supported by the spindle head 18 free to rotate about its axial center; a table 20, for carrying a workpiece W, arranged on the bed 11 allowing the table to swivel about a swivel center axis paralleling the Y-axis (along the "B-axis"), and configured to allow the table to rotate upon a rotational center axis paralleling the Z-axis (along the "C-axis"); and a load-applying mechanism 30 for applying a load by pressing from above one end, opposite the workpiece W-carrying end, of the table 20.

Additionally, the machine tool 1 is provided with a Y-axis guide mechanism 41 for guiding the movement of the first saddle 16 along the Y-axis, a X-axis guide mechanism 42 for guiding the movement of the second saddle 17 along the X-axis, a Z-axis guide mechanism (not illustrated) for guiding the movement of the spindle head 18 along the Z-axis, a Y-axis feed mechanism 44 for moving the first saddle 16 along the Y-axis, a X-axis feed mechanism 45 for moving the second saddle 17 along the X-axis, a Z-axis feed mechanism 46 for moving the spindle head 18 along the Z-axis, a main spindle drive mechanism (not illustrated) for rotating the main spindle 19 axially, a swivel drive mechanism 25 for swiveling the table 20 upon the B-axis to index the table 20 to a specific swivel angle position, a table rotational drive mechanism (not illustrated) for rotating the table 20 upon the C-axis to index the table 20 to a specific rotational angle position.

The bed 11 comprises, with a rectangular base when seen in plan view: left and right sidewalls 13 and 14 (left sidewall 13 on the front left side and right sidewall 14 on the front right side) disposed vertically on both sides of the base 12 across an interval therebetween on the X-axis, and a sidewall 15 (rear sidewall) disposed vertically to the base 12 at the back between the right and left sidewalls 13 and 14.

A waste removal hole 12a of which one end opens to the top center portion of the base 12 and the other end opens to the back outside surface of the base 12 is formed in the base 12, and the backside wall 15 has a through hall 15a passing along the Y-axis through the backside wall.

The table 20 is provided in front of the backside wall 15, and comprises a pallet mounting unit 21 on which a pallet P carrying the workpiece W is mounted, a table body 22 formed so that a section through the table body 22 is L-shaped, for supporting the pallet mounting unit 21 rotatably along the C-axis, an axially rotatable rotary shaft 23 disposed so that its own axis coincides with the swivel center axis, with a first end of the rotary shaft 23 affixed to the back surface of the table 22, and an annular rotary member 24 provided on a locus on the outer periphery of a second end of the rotary shaft 23 to rotate together with the rotary shaft 23.

The table body 22, which is disposed uniformly spaced from the upper surface of the base 12 over the waste removal hole 12a, rotates with the rotary shaft 23 to swivel upon the B-axis. The first end of the rotary shaft 23 is rotatably supported inside the through-hole 15a via a bearing 15b, such as a cross roller bearing, provided to the inner peripheral surface of the through-hole 15a in the backside wall 15.

The swivel drive mechanism 25, which is configured with a rotator 25a provided to the outer peripheral surface of the axial center of the rotary shaft 23, a stator 25b provided to the inner peripheral surface of the through-hole 15a in the backside wall 15 to surround the rotator 25a at a predetermined interval from the rotator 25a, axially rotates the rotary shaft 23 to index the table body 22 (the workpiece Won the pallet P) to a specific swivel angle position upon the B-axis. The table rotational drive mechanism (not illustrated) rotates the pallet mounting unit 21 upon the C-axis to index the table body (the workpiece Won the pallet P) to a specific rotational angle position upon the C-axis.

The load-applying mechanism 30 comprises two riding rollers 31 disposed axially parallel to the axis of the rotary shaft 23, for contact with the perimeter of the rotary member 24, a hold-down mechanism 32 installed on the backside wall 15, for pressing from above the perimeter of the rotating wheel 24 to apply a load on the perimeter, while supporting the riding rollers 31 free to rotate axially, and a load-adjusting bolt 39 provided to the hold-down mechanism 32, for adjusting the load applied by the hold-down mechanism 32.

The riding rollers 31 are provided to either side of the plumb plane including the axis of the rotary shaft 23, and are disposed so as to be axially same in position with the rotary shaft 23. In addition, a through-hole 31a is formed so as to axially pass through the riding rollers 31 along its axis.

The hold-down mechanism 32 comprises a housing 33 formed hollow and bottomless, moving members 34 provided inside the housing 33 free to move perpendicularly, pistons 35 disposed under the moving members 34 free to move perpendicularly in the housing 33, disc springs 36 provided between the moving members 34 and the pistons 35, a stop 37 provided to the lower side of the housing 33 so as to protrude inward to engage with the piston 35, for preventing the piston 35 from dropping, and supporting shafts 38 inserted into the through-hole 31a in the riding rollers 31, for supporting the riding rollers 31 rotatably upon its own axis.

The housing 33 is provided on the back face of the backside wall 15, and a screw hole 33a screwed together with the load-adjusting bolts 39 is formed so as to perpendicularly pass through the upper face of the housing 33. The moving members 34 has a cylindrically formed protrusion 34a inserted into the center hole in the disc springs 36, and the pistons 35 has a recess 35a into which the protrusion 34a of the moving members 34 is inserted.

The pistons 35 are configured so that their under side protrudes from the under face of the housing 33, and the supporting shafts 38 are mounted on the under face of the pistons 35. Furthermore, a step is formed on the perpendicular center of the piston 35s so that the stop 37 is engaged to this step. It should be understood that two moving members 34, two pistons 35, two disc springs 36, two supporting shafts 38 and two load-adjusting bolts 39 are provided in one-to-one correspondence with the riding rollers 31.

In the load-applying mechanism 30, the load that depends on the amount of bending of the disc springs 36 is applied to the perimeter of the rotary members 24 via the riding rollers 31, and the moving members 34 are moved perpendicularly by adjusting the amount of screwing of the load-adjusting bolts 39, so that the amount of bending of the disc springs 36 is adjusted, with the result that the load applied on the perimeter of the rotating members 24.

The first saddle 16 has a rectangular frame shape with the transverse side parallel to the X-axis and the longitudinal side parallel to the Y-axis. The end portions of the long transverse sides are supported to move freely along the Y-axis on the top of the left sidewall 13 and right sidewall 14.

The second saddle 17 comprises a shoulder 17a extending to each side in the Y-axis direction, and a through-hole 17b passing vertically through the second saddle 17. The second saddle 17 is disposed within the frame of the first saddle 16 with the shoulders 17a supported by the top of the transverse portions of the first saddle 16 so that the second saddle 17 can move freely on the X-axis.

The spindle head 18 is supported to move freely on the Z-axis inside the through-hole 17b in the second saddle 17. The main spindle 19 is disposed above the table 20 with the main spindle axis parallel to the Z-axis and the main spindle 19 freely rotatably supported by the bottom portion of the spindle head 18.

The Y-axis guide mechanism 41 comprises guide rails 41a aligned with the Y-axis on the top of the left sidewall 13 and right sidewall 14, and sliders 41b that are affixed to the bottom of both long end parts of the first saddle 16 and engage and move freely on the guide rails 41a.

The Y-axis feed mechanism 44 comprises drive motors 44a disposed on the top of left sidewall 13 and right sidewall 14, ball screws 44b, and nuts 44c. The ball screws 44b are disposed aligned with the Y-axis on the top of the left sidewall 13 and right sidewall 14, and are axially rotated by the corresponding drive motors 44a. The nuts 44c are affixed to the outside surfaces of the longitudinal portions of the first saddle 16, and screw onto the matching ball screws 44b.

When the drive motors 44a of this Y-axis feed mechanism 44 are driven and the ball screws 44b thus turn axially, the nuts 44c move along the ball screws 44b and the first saddle 16 thus moves on the Y-axis guided by the guide rails 41a and sliders 41b of the Y-axis guide mechanism 41.

The X-axis guide mechanism 42 comprises guide rails 42a disposed aligned with the X-axis on the top of the transverse side portions of the first saddle 16, and sliders 42b that are affixed to the bottoms of the shoulders 17a of the second saddle 17 and engage and move freely on the guide rails 42a.

The X-axis feed mechanism 45 comprises a drive motor 45a disposed to one longitudinal side portion of the of the first saddle 16, a ball screw 45b that is disposed on the X-axis inside the frame of the first saddle 16 and is axially rotated by the drive motor 45a, and a nut (not illustrated in the figures) that is affixed to the second saddle 17 and screws onto the ball screw 45b.

When the drive motor 45a of this X-axis feed mechanism 45 is driven and the ball screw 45b turns axially, the nut moves along the ball screw 45b and the second saddle 17 thus moves along the X-axis guided by the guide rails 42a and sliders 42b of the X-axis guide mechanism 42.

The Z-axis guide mechanism (not illustrated in the figures) comprises guide rails (not illustrated in the figures) aligned with the Z-axis on the inside of both X-axis sides of the through-hole 17b of the second saddle 17, and sliders (not illustrated in the figures) that are affixed to the outside of both X-axis sides of the spindle head 18 and engage and move freely on these guide rails (not illustrated in the figures).

The Z-axis feed mechanism 46 comprises drive motors 46a disposed on the top of both X-axis sides of the second saddle 17, ball screws (not illustrated in the figures) that are disposed aligned with the Z-axis on the inside of both X-axis sides of the second saddle 17 and are axially rotated by the drive motors 46a, and nuts (not illustrated in the figures) that are affixed to the outside of both X-axis sides of the spindle head 18 and screw onto the ball screws (not illustrated in the figures).

When the drive motors 46a of this Z-axis feed mechanism 46 are driven and the ball screws (not illustrated in the figures) turn axially, the nuts (not illustrated in the figures) move along the ball screws so that the spindle head 18 moves on the Z-axis guided by the guide rails (not illustrated in the figures) and sliders (not illustrated in the figures) of the Z-axis guide mechanism (not illustrated in the figures).

The waste recovery device 50 comprises a discharge mechanism 51 that conveys cutting waste resulting from processing the workpiece W in a specific transportation direction and removes the waste from the machine tool 1, a storage tank 54 disposed below the discharge mechanism 51 on the upstream side in the waste transportation direction, and storing the cutting fluid, a collection box 55 disposed below the discharge mechanism 51 at the downstream end of the transportation direction.

The discharge mechanism 51 comprises a conveyor belt 52 composed of a plurality of plates connected in an endless loop for carrying cutting waste to the collection box 55, and a support unit 53 that houses and enables the conveyor belt 52 to move freely in a loop. The support unit 53 has a horizontal portion 53a disposed inside the waste removal hole 12a, and an incline portion 53c disposed outside the machine tool 1. The discharge mechanism 51 also has a drive motor (not illustrated in the figures) that causes the conveyor belt 52 to move in the direction of the arrows shown in FIG. 3.

The horizontal portion 53a of the support unit 53 is open on the top and bottom. Waste and cutting fluid drop from this open portion 53b onto the conveyor belt 52, and cutting fluid that drops onto the conveyor belt 52 flows down through this open portion 53b into the storage tank 54 as further described below. The bottom of the downstream end part of the incline portion 53c of the support unit 53 is open, and waste conveyed by the conveyor belt 52 drops through this opening (not shown in the figures) into the collection box 55 below. The storage tank 54 is located below the horizontal portion 53a of the support unit 53 and collects the cutting fluid that drops from the conveyor belt 52.

With this waste recovery device 50, waste and cutting fluid are guided into the waste removal hole 12a by covers not shown disposed appropriately in the space enclosed by the sidewalls 13, 14, 15, and drop from this waste removal hole 12a onto the conveyor belt 52, which is driven in a circle by a drive motor (not shown in the figures). The cutting waste is then conveyed outside the machining center by the conveyor belt 52, falls into the collection box 55 located below the downstream end of the conveyor belt 52, and is recovered. The cutting fluid drops from the conveyor belt 52 and is collected in the storage tank 54.

With the machine tool 1 according to this embodiment of the present invention, the load is applied on the second end of the rotary shaft 23 by a load-applying mechanism 30 so that the swivel center axis, the upper surface of the pallet P and the rotary shaft 23 are horiozontalized, with the swivel angle position of the table 20 at 0°.

Specifically, the load that depends on the amount of bending of the disc springs 36 is applied on the perimeter of the rotary member 24 via the riding rollers 31 by the hold-down mechanism 32, and the perpendicular position of the moving members 34 is adjusted by the load-adjusting bolts 39 and thus the amount of bending of the disc springs 36 is controlled, so that the load applied on the perimeter of the rotary member 24 is adjusted.

When the load adjusted in this way is applied on the perimeter of the rotary member 24, the downward load acts on the table 20 on the side, along the swivel center axis, across the bearing 15b from the table body 22 side, so that a moment counteracting the moment originating in the weight of the table itself and the workpiece W carried on the table 20 acts on the table 20. Such a counteracting moment prevents the swivel center axis (the pallet P, table body 22 and the rotational center axis 23) from tilting downwards due to the moment originating in the weight of the table 20 itself and the workpiece W to horizontally equilibrate the swivel center axis, the upper surface of the pallet P and the rotary shaft 23.

Figure 4:
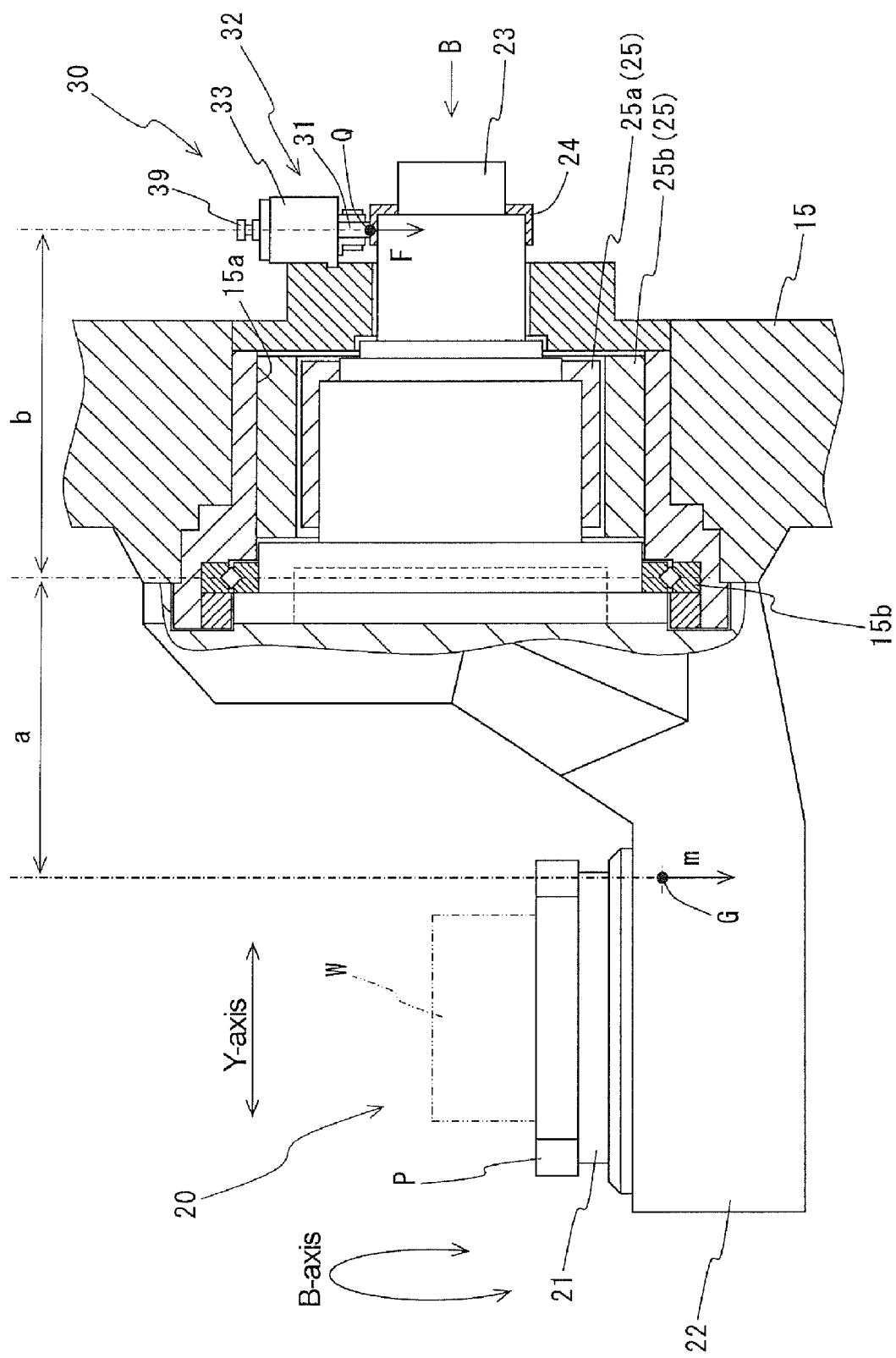
FIG. 4 is a sectional schematic view showing a table and a load-applying mechanism according to a preferred embodiment of the present invention.
Figure 5:
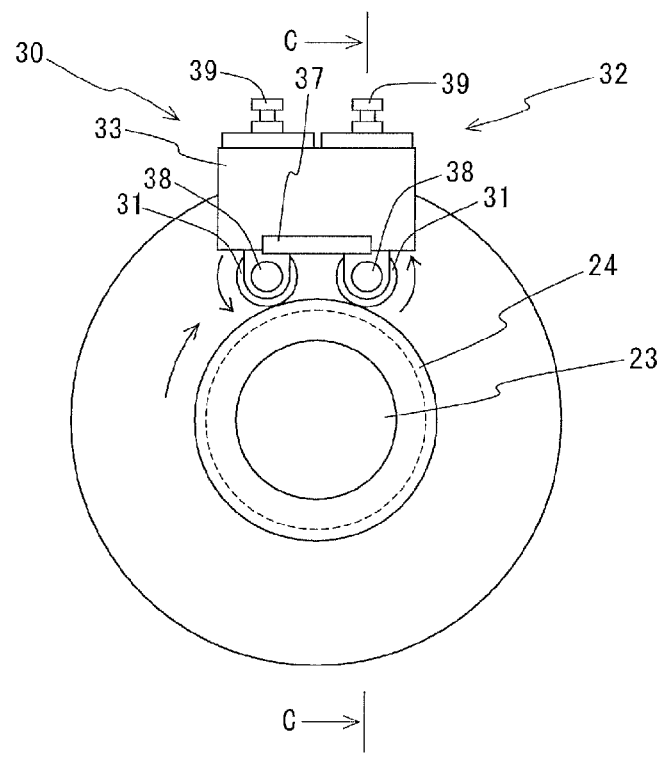
FIG. 5 is a side view through line B-B in FIG. 4.
Figure 6:
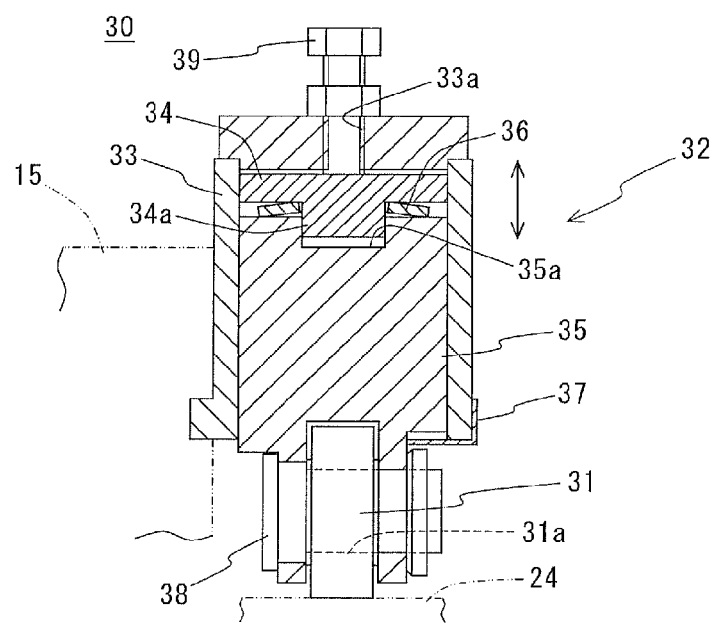
FIG. 6 is a section view through line C-C in FIG. 5.

As illustrated in FIG. 4, the load applied on the perimeter of the rotary member 24 makes the moment, which is the product of the total load applied via the riding rollers 31 and the distance b with respect to the swivel center axis between the portion supported by the bearing 15b, of the rotary shaft 23 and the site Q of the rotary member 24 where the load is applied approximately equal to the moment, and the moment, which is the product of the total weight m of the table 20 carrying the workpiece Wand the distance a with respect to the swivel center axis between the portions supported by the bearing 15b, of the rotary shaft 23 and the center of gravity G of the table 20 carrying the workpiece W approximately equal. The distance b is preferably made longer than the distance a, because lessening the load F applied to counteract the moment reduces the impact of the applied load F on the life of the bearing 15b.

Therefore, when the swivel center axis, the upper surface of the pallet P and the rotational center axis 23 are horizontally equilibrated, the first saddle 16 is guided by the Y-axis guide mechanism 41 and moved along the Y-axis by the Y-axis feed mechanism 44, the second saddle 17 is guided by the X-axis guide mechanism 42 and moved along the X-axis by the X-axis feed mechanism 45, the spindle head 18 is guided by the Z-axis guide mechanism (not shown in the figures) and moved along the Z-axis by the Z-axis feed mechanism 46, and the main spindle 19 is driven rotationally on its axis by the main spindle rotation drive mechanism (not shown in the figures), and the workpiece W held on the pallet P placed on the table 20 is thus processed by the tool T held in the main spindle 19.

Waste produced by machining and cutting fluid supplied appropriately to where the tool T and workpiece W contact drop from the waste removal hole 12a onto the conveyor belt 52. The waste is conveyed by the conveyor belt 52 and recovered in the collection box 55, and the cutting fluid flows down and off the conveyor belt 52 into the storage tank 54 located below the conveyor belt 52.

The pallet mounting unit 21 of the table 20 is rotated on the C-axis and indexed to a predetermined rotational angle position by the table rotation drive mechanism (not shown in the figures), and the table body 22 of the table 20 is swiveled on the B-axis by the swivel drive mechanism 25 and indexed to a predetermined rotational angle position, to index the workpiece W on the pallet P (the workpiece W on the pallet P) to a specific rotational angle position.

With the machine tool 1 according to this embodiment of the present invention, the rotary shaft 23 (the rotary member 24) is pressed from above to apply the downward load on the side of the table 20, along the swivel center axis, across the bearing 15b from the table body side 22, so that the moment originating in the weight of the table 20 itself and the workpiece is counteracted and the swivel center axis, the upper surface of the pallet P and the rotational center axis 23 are horizontalized. Therefore, the workpiece W is processed with a high degree of precision.

Furthermore, although applying the load on the rotary shaft 23 increases the load acting on the bearing 15b, doing so makes it possible to counteract the moment that has a larger impact on the life of the bearing 15b than the load, so that the bearing life is lengthened.

The reason why a configuration in which the load applied on the rotary shaft 23 is adjusted by the load-adjusting bolts 39 is taken is that the amount of load applied on the rotary shaft 23 by the hold-down mechanism 32 requires to be varied when the weight of the workpiece W is changed, because the amount of bending of the swivel center axis, the upper surface of the pallet P and the rotary shaft 23 differs from the weight of the workpiece W to be processed. Adjusting the load applied on the rotary shaft 23 with the load-adjusting bolts 39 makes it possible to apply on the rotary shaft 23 the load that depends on the weight of the workpiece W, so that given that the weight of the workpiece W is changed, repeatedly equilibrating horizontally the swivel center axis, the upper surface of the pallet P and the rotary shaft 23 enables high precision processing to be performed, and meanwhile incompletely counteracting the moment prevents the bearing life from being shortened.

Furthermore, the configuration in which the load is applied on the rotary shaft 23 by the riding rollers 31 lessens the friction resistance developed between the riding rollers 31 and the rotary shaft 23 to reduce the load applied on the drive motor in the swivel drive mechanism 25 and to enable the smooth rotation of the rotary shaft 23.

The reason why the configuration in which the load is applied on the rotary shaft 23 by the riding rollers 31 provided to either side of the plumb plane including the axis of the rotary shaft 23 is taken is that, for example, given that only one riding roller is provided, there is a possibility of inadequate application of load on the rotary shaft 23, because the riding rollers 31 or the rotary shaft 23 runs idle, when the load is applied on the rotary shaft 23, with the perimeter where the abutting rollers 31 contacts with the rotary member 24 out of the plumb plane including the axis of the rotary shaft 23. Pressing the rotary shaft 23 by the two abutting rollers 31 provided to either side of the plumb plane including the axis of the rotary shaft 23 makes is possible to hold down balancingly the rotary shaft 23 to apply the load adequately.

Moreover, in this configuration the rotary member 24, which is provided on the outer-peripheral locus on the rotary shaft 23, contacts with the riding rollers 31, so that advantageously, the rotary member 24 perimeter with which the abutting rollers 31 contacts is configured so as to be unlikely to be worn out, and the worn-out rotary member 24 is exchanged.

A preferred embodiment of the present invention is described above, and it will be obvious to one with ordinary skill in the related art that the invention is not limited to this embodiment.

In this embodiment, the load-applying mechanism 30 is configured so that the load applied on the perimeter of the rotary member 24 is adjusted by the load-adjusting bolts 39, but the invention is not so limited, as a load-applying mechanism 60 could be configured so as to automatically control the load.

In such a configuration, as illustrated in FIG. 7, the load-applying mechanism 60 comprises hydraulic cylinder (the hold-down mechanism) 61 having the riding rollers 31 and a support rod 61a whose lower end supports the riding rollers 31 free to rotate axially, for raising the support rod 61 a so as to allow the riding rollers 31 to pressing from above with the riding rollers 31 the perimeter of the rotary member 24 to apply load in the perimeter, a hydraulic oil supply source 62 for supplying the hydraulic cylinders 61 with hydraulic oil, a pressure-adjusting mechanism (the load-adjusting mechanism) 63 for adjusting he pressure of the hydraulic oil supplied to the hydraulic cylinders 61, a displacement sensor 64 for detecting the plumb displacement of the rotary member 24, a control device 65 for controlling the hydraulic oil supply source 62 and the pressure-adjusting mechanism 63, and the load-applying mechanism 60 applies on the rotating member 24 the load that depends on the pressure of the hydraulic oil supplied to the hydraulic cylinders 61.

It is to be noted that the riding rollers 31 are mounted on the lower end of the support rod 61a of the hydraulic cylinders 61 with the support shaft 38. In addition, two hydraulic cylinders 61 are provided in one-to-one correspondence with the riding rollers 31. The hydraulic oil supply source 62 supplies the hydraulic cylinders 61 with the hydraulic oil, and the pressure-adjusting mechanism 63 controls the pressure of the hydraulic oil supplied to the hydraulic cylinders 61.

The displacement sensor 64 detects the plumb displacement of the rotary member 24, relatively to the plumb position of the rotary member 24 with the upper surface of the pallet P horizontalized by applying load as appropriate with the hydraulic cylinders 61 on the rotary member 24.

The control device 65 controls, based on the displacement detected by the displacement sensor 64, the pressure-adjusting mechanism 63 so as to adjust the pressure of the hydraulic oil supplied to the hydraulic cylinders 61 to control the load applied on the perimeter of the rotary member 24 to eliminate the displacement.

In the load-applying mechanism 60 having such a configuration, for example, when the load to be applied on the rotary shaft 23 is varied, depending on the weight of the workpiece W to be processed, the disrupted balance of the moment causes the upper surface of the pallet P and the rotary shaft 23 to tilt, resulting in a change in the perpendicular position of the rotary member 24, so that this change in position is detected as displacement by the displacement sensor 64. Then, the control device 65 controls, based on the displacement sensed by the displacement sensor 64, the pressure-adjusting mechanism 63 so as to adjust the load applied on the outer-peripheral locus on the rotary shaft 23 to eliminate the displacement.

Thus, in such a load-applying mechanism 60, the same effect as described in the foregoing is achieved. Furthermore, the load applied to the outer-peripheral locus on the rotary shaft 23 is automatically adjusted, when the upper side of the pallet P and the rotary shaft 23 tilt because the weight of the workpiece W to be processed, for example, is changed, so that precise and efficient load adjustment is performed.

The displacement sensor 64 may be configured so as to detect the plumb displacement of the table body 22 and the rotary shaft 23, not of the rotary member 24. Furthermore, two riding rollers 31 do not always require to be provided, a single riding roller 31 may press the rotary shaft 23.

The configurations of the load-applying mechanisms 30, 60, and the method of adjusting the tilting of the swivel center axis, the upper surface of the pallet P and the rotary shaft 23 are also not limited to the preferred embodiment described above. In addition, the table 20 is placed on the bed 11 in this embodiment of the invention, but the invention is not so limited as the table 20 could be placed on a moving structure as appropriate.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A machine tool comprising:
   a table provided free to swivel about a horizontal swivel center axis, said table provided with a table body for carrying a workpiece, and disposed with its axis coaxial with the swivel center axis, to provide the table free to rotate about its axial center, and having a rotary shaft a first end of which is affixed to said table body;
   a support structure rotatably supporting said rotary shaft via a bearing;
   a swivel drive mechanism for rotating said rotary shaft about its axial center to index said table body to a predetermined swivel angle position;
   a main spindle, for holding a tool, provided free to rotate centered on its own center axis;
   a rotational drive mechanism for rotating said main spindle with its center axis as center;
   feed mechanisms for shifting said support structure and said main spindle relative to each other;
   a riding member abutting on an outer-peripheral locus along a second end of said rotary shaft, off a bearing-supported portion of said rotary shaft; and
   a hold-down mechanism arranged on said support structure, for supporting said riding member and for pressing on the outer-peripheral locus from above by means of said riding member to apply a load to the outer-peripheral locus.

2. A machine tool as set forth in claim 1, further comprising a load-adjusting mechanism for adjusting the load applied by said hold-down mechanism.

3. A machine tool as set forth in claim 1, wherein said riding member is configured with rollers disposed with their axes parallel to the axis of said rotary shaft, and supported by said hold-down mechanism free to rotate on their axial centers.

4. A machine tool as set forth in claim 2, further comprising:

a displacement sensing means for detecting displacement of said table body or said rotary shaft along the vertical, with as a standard the position of said table body or said rotary shaft along the vertical when the upper surface of said table body is horizontal; and a control means for controlling, based on the displacement detected by said displacement sensing means, said load-adjusting mechanism so as to adjust the load applied to the outer-peripheral locus along said rotary shaft to eliminate the displacement.

5. A machine tool as set forth in claim 1, further comprising an annular rotary member provided on the outer-peripheral locus along said rotary shaft, to rotate in conjunction with said rotary shaft, wherein said riding member is configured so as to abut on the outer periphery of said rotary member.

6. A machine tool comprising:

a table provided free to swivel about a horizontal swivel center axis, said table provided with a table body for carrying a workpiece, and disposed with its axis coaxial with the swivel center axis, to provide the table free to rotate about its axial center, and having a rotary shaft a first end of which is affixed to said table body;

a support structure rotatably supporting said rotary shaft via a bearing;

a swivel drive mechanism for rotating said rotary shaft about its axial center to index said table body to a predetermined swivel angle position;

a main spindle, for holding a tool, provided free to rotate centered on its own center axis;

a rotational drive mechanism for rotating said main spindle with its center axis as center;

feed mechanisms for shifting said support structure and said main spindle relative to each other;

riding members abutting on an outer-peripheral locus on a second end of said rotary shaft, off a bearing-supported portion of said rotary shaft; and hold-down mechanisms arranged on said support structure, for supporting said riding members and for pressing on the outer-peripheral locus from above by means of said riding members to apply a load to the outer-peripheral locus.

7. A machine tool as set forth in claim 6, further comprising load-adjusting mechanisms for adjusting the load applied by said hold-down mechanisms.

8. A machine tool as set forth in claim 6, wherein said riding members are configured with rollers disposed with their axes parallel to the axis of said rotary shaft, and supported by said hold-down mechanisms free to rotate on their axial centers.

9. A machine tool as set forth in claim 7, wherein:

said riding members are disposed on either side of a plumb plane in which the axis of said rotary shaft lies; and said hold-down mechanisms and said load-adjusting mechanisms are provided corresponding respectively to each of said riding members.

10. A machine tool as set forth in claim 7, further comprising:

a displacement sensing means for detecting displacement of said table body or said rotary shaft along the vertical, with as a standard the position of said table body or said rotary shaft along the vertical when the upper surface of said table body is horizontal; and a control means for controlling, based on the displacement detected by said displacement sensing means, said load-adjusting mechanisms so as to adjust the load applied to the outer-peripheral locus along said rotary shaft to eliminate the displacement.

11. A machine tool as set forth in claim 6, further comprising an annular rotary member provided on the outer-peripheral locus along said rotary shaft, to rotate in conjunction with said rotary shaft, wherein said riding members are configured so as to abut on the outer periphery of said rotary member.

* * * * *